United States Patent [19]
Bartscher et al.

[11] Patent Number: 5,400,649
[45] Date of Patent: Mar. 28, 1995

[54] DEVICE FOR MONITORING THE PRESSURE OF A VEHICLE TIRE

[75] Inventors: Peter Bartscher; Stefan Herzog, both of Hannover; Helmut Ulrich, Springe; Gerhard Stegemann, deceased, late of Salzhemmendorf, all of Germany, by Marita Stegemann, Ursula Stegemann, legal representatives

[73] Assignee: WABCO Westinghouse Fahrzeugbremsen GmbH, Hannover, Germany

[21] Appl. No.: 86,921

[22] Filed: Jul. 2, 1993

Related U.S. Application Data

[63] Continuation of Ser. No. 776,980, Oct. 15, 1991, abandoned, and a continuation-in-part of Ser. No. 575,376, Aug. 29, 1990, Pat. No. 5,101,754.

[30] Foreign Application Priority Data

Oct. 15, 1990 [DE] Germany ............... 40 32 675.6

[51] Int. Cl.[6] ............................................. B60C 23/02
[52] U.S. Cl. ................................................ 73/146.5
[58] Field of Search .................. 73/146.8, 146.5, 146.3

[56] References Cited

U.S. PATENT DOCUMENTS

5,101,754  4/1992  Bartscher et al. ............... 73/146.8
5,230,743  7/1993  Reinecke ........................ 73/146.8

Primary Examiner—Richard E. Chilcot, Jr.
Assistant Examiner—William L. Oen
Attorney, Agent, or Firm—Horst M. Kasper

[57] ABSTRACT

An apparatus is furnished for sensing the tire pressure and for generating a signal by way of an actuator. If the tire pressure drops below the predetermined reference tire pressure, then this is signalled immediately and instantly within a relatively small pressure tolerance threshold. The pressure sensitive device 1 includes a valve device 7. The valve device 7 connects the tire pressure, applied to the actuator 4 and acting against the force of the compression spring 6, to the atmosphere if the tire pressure drops below a predetermined reference tire pressure. The apparatus is suitable for generating a permanent signal, even in case no further pressure remains in a tire.

25 Claims, 4 Drawing Sheets

DEVICE FOR MONITORING THE PRESSURE OF A VEHICLE TIRE

CROSS-REFERENCE TO RELATED APPLICATIONS

This is a continuation of application Ser. No. 07/776,980, filed Oct. 15, 1991, now abandoned, and a continuation-in-part application of another application filed Aug. 29, 1990, and bearing Ser. No. 575,376, now U.S. Pat. No. 5,101,754. The entire disclosure of this latter application, including the drawings thereof, is hereby incorporated in this application as if fully set forth herein.

BACKGROUND OF THE INVENTION

1. Field of the Invention

The invention relates to a device for the monitoring of the pressure of a vehicle tire, where a pressure sensitive device is disposed at the vehicle wheel for scanning the tire- pressure, including a pressure inlet connected to the interior of the tire and an actuator subjected to the tire pressure against a restoring force, where the actuator serves for generating a regulating distance indicating a tire pressure drop.

2. Brief Description of the Background of the Invention Including Prior Art

The device as set forth above is known from the U.S. Pat. No. 4,238,955, which U.S. Pat. No. 4,238,955 appears to be an equivalent of the German Printed Patent Publication DE-28 13 058 C2. The conventional device scans the tire pressure with a pressure sensitive device, disposed at the vehicle wheel, and the device is to display a signal in case of an improper tire pressure. A piston serving as an actuator is subjected to the tire pressure against a restoring force. The restoring force prevails below a predetermined tire pressure, such that a regulating distance is generated, which serves for the actuation of transfer means and for a signal generation. A slowly dropping tire pressure causes a delayed response of the pressure sensitive device, and it can occur that such a pressure drop is initially not indicated.

The conventional device is also taught as an embodiment serving for the monitoring of twin tires. The described response behavior of the pressure sensor device can lead to a situation where, in case of a defect of one of the two tires, a pressure balancing occurs by an ensuing flow of air from the properly operating tire into the defective tire, until the properly operating tire has also dropped so far below operating pressure that this otherwise properly operating tire loses its readiness for operation, at least up to the point in time where an exchange of the defective tire is performed.

SUMMARY OF THE INVENTION

1. It is an object of the present invention to provide an improved tire pressure monitoring device, such that a tire pressure dropping below a predetermined point pressure is displayed instantly within a relatively small pressure tolerance threshold.

It is another object of the present invention to provide a tire monitoring device suitable for twin tires without allowing one defective twin tire to decrease the capabilities of the properly operating twin tire.

It is yet a further object of the present invention to furnish a tire monitoring system, which allows a precise setting of a predetermined pressure for a response in case of a tire pressure drop.

These and other objects and advantages of the present invention will become evident from the description which follows.

2. Brief Description of the Invention

The present invention provides an apparatus for monitoring a pressure of a vehicle tire. A vehicle wheel comprises a tire mounted to the vehicle wheel. A pressure inlet port is connected to the interior of the tire. A valve device has an inlet port, a control inlet port, and an outlet port. The inlet port of the valve device is connected to the pressure inlet port. The control inlet port is subjectable to a pressure present in the tire. The valve device is actuatable by the pressure present in the tire. An actuator is connected to the outlet port of the valve device and is actuatable by the pressure present in the tire. The actuator is subjected to a restoring force. The valve device transmits the pressure, present in the tire, to the outlet port and to the actuator in a first switching position of the valve device for a situation where the tire pressure is at a predetermined reference tire pressure or above the predetermined reference tire pressure. The restoring force opposes the pressure present in the tire and transmitted to the actuator. The valve device separates the pressure inlet port from the actuator in a second switching position of the valve device in a situation where the pressure, present in the tire, has dropped to below the predetermined tire pressure. The valve device connects the actuator through a discharge port to the atmosphere in the second switching position of the valve device. The actuator generates a regulating distance S corresponding to a transition position value from the first switching position of the valve device to the second switching position of the valve device. The actuator thereby indicates a drop of the pressure present in the tire.

A sensor can scan the position of the actuator over a regulating distance S. A transfer mechanism can transfer the position of the actuator to the sensor. The transfer mechanism can be formed by an elastic Bowden train.

A mechanical signal device can be acutuated by the actuator for generating an optically perceivable signal or an acoustically perceivable signal depending on the position of the actuator relative to the regulating distance S.

A second pressure inlet port can monitor the pressure of a second tire. The second pressure inlet port can be subjected to the pressure of the second tire. A first pressure line can be connected to the first pressure inlet port of the first tire. A second pressure line can be connected to the second pressure inlet port of the second tire. A second valve device can have a first port connected to the first pressure line and a second port connected to the second pressure line. The second valve device can provide a switchable connection between the first port and the second port and is actuatable by the actuator for connecting and separating the first pressure inlet port and the second pressure inlet port. The second valve device actuatable by the actuator can furnish, in a first switching position at a predetermined tire pressure or above the predetermined tire pressure, a connection between the first pressure inlet port and the second pressure inlet port and, below a predetermined tire pressure, a separation of the first pressure inlet port from the second pressure inlet port.

Adjustment means can be furnished at the valve device for setting a pressure switching determining a pressure set point between the two positions of the valve device.

The valve device control inlet port can be connected to the pressure inlet port.

A pressure inlet port can be connected to an interior of a tire. A first valve device can have an inlet port, a control inlet port, an outlet port, and a discharge port. The inlet port of the valve device can be connected to the pressure inlet port. The control inlet port can be connected to the pressure inlet port for actuating the valve device depending on the pressure present at the pressure inlet port. The valve device can transmit the pressure, present at the pressure inlet port, to the outlet port in a first switching position of the valve device in a situation where the pressure at the pressure inlet port is at a predetermined pressure or above the predetermined pressure. The valve device can separate the pressure, present at the pressure inlet port, from the outlet port in a second switching position of the valve device in a situation where the pressure, present at the pressure inlet port, has dropped to below the predetermined pressure. The valve device can connect the outlet port through the discharge port to the atmosphere in the second switching position of the valve devece. An actuator is connected to the outlet port of the valve device and can be actuated by the pressure present at the outlet port. The actuator is subjected to a restoring force. The restoring force opposes the pressure present at the outlet port and transmitted to the actuator. The actuator assumes a first positional value corresponding to a first switching position of the valve device. The actuator assumes a second positional value corresponding to the second switching position of the valve device. A transition of the actuator from the first positional value to the second positional value indicates a drop of the pressure present in the pressure inlet port.

A wheel can support the valve device and the actuator. A tire can be mounted to the wheel and can be connected to the pressure inlet port. A distance between the first positional value and the second positional value can be formed by a regulating distance S.

A sensor can scan the positional values of the actuator and a transfer mechanism can transfer the positional values of the actuator to the sensor. The transfer mechanism can be formed by an elastic Bowden train.

A mechanical signal device can be acutuated by the actuator for generating an optically perceivable signal or an acoustically perceivable signal depending on the positional value of the actuator.

A second pressure inlet port can be connected to a second tire. A first pressure line can be connected to the first pressure inlet port. A second pressure line can be connected to the second pressure inlet port. A second valve device can have a first port connected to the first pressure line and a second port connected to the second pressure line. The second valve device can provide a switchable connection between the first port and the second port actuatable by the actuator for connecting and separating the first pressure inlet port and the second pressure inlet port. The second valve device actuatable by the actuator can furnish, in a first switching position at the predetermined tire pressure or above the predetermined tire pressure, a connection between the first pressure inlet port and the second pressure inlet port and, below a predetermined tire pressure, a separation of the first pressure inlet port from the second pressure inlet port.

A first wheel can support the first valve device and the actuator. A tire can be mounted to the first wheel and can be connected to the first pressure inlet port. The first pressure inlet port can be subjected to the pressure of the first tire. A second tire can be connected to the second pressure inlet port for monitoring a pressure of the second tire. The second pressure inlet port can be subjected to the pressure of the second tire.

Adjustment means can be furnished at the valve device for setting a pressure switching, determining a pressure set point between two positions of the first valve device.

The invention is associated with the advantage that a completely empty tire or lack and non-presence of a measurement pressure corresponding to the tire pressure, respectively, generates a permanent signal at the pressure sensitive device.

It is another advantage that, in case of a defect of one of the two tires of a twin tire, only a limited pressure balancing between the pressures in the two tires can occur bevore the pressure sensitive device switches to the signal generating state.

According to yet a further embodiment of the invention, even in case of an interruption of the connection between one of the twin tires and the pressure sensitive device, for example, caused by a defective assembly or by a destruction during the operation of the vehicle, the pressure of the tire, not subject to the defect, can drop only slightly until a display of the defect occurs.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENTS

The device elements of equal or comparable function are designated with the same reference numerals, wherever their repetition in FIGS. 1–4 is deemed to provide a better understanding, In accordance with the present invention there is provided an apparatus for a monitoring of a pressure of a vehicle tire. A pressure sensitive device for scanning the tire pressure is furnished at a vehicle wheel. The tire pressure sensitive device includes a pressure inlet port connected to the tire. An actuator can be subjected to the tire pressure against a restoring force. The actuator serves for the generation of a regulating distance S, indicating a tire pressure drop. A valve device 7 is disposed between the pressure inlet port 2 and the actuator 4 and the valve device 7 is actuatable with the tire pressure. The valve device 7 includes a control inlet port 8 subjectable to the tire pressure. The valve device 7 serves, in a first switching position at a predetermined or above a predetermined tire pressure, to connect the pressure inlet port 2 to the actuator 4. The valve device 7 serves, in a second switching position below the predetermined tire pressure, to separate the pressure inlet port 2 from the actuator 4 and to connect the actuator 4 through a discharge port 9 to the atmosphere.

The restoring force, directed onto the actuator 4 and against the tire pressure, can serve for generating the regulating distance S, indicating a drop in tire pressure.

The transfer mechanism 10 can be furnished for the transfer of the regulating distance S to a sensor 12 scanning the regulating distance S. The transfer mechanism 10 can be formed of an elastic linkage 19, which linkage is an elastic Bowden train.

The regulating distance S, which can be generated with the actuator 4, can serve for actuating a mechanical signal device 20, which allows to generate an optically or acoustically perceivable signal.

Figure 2:
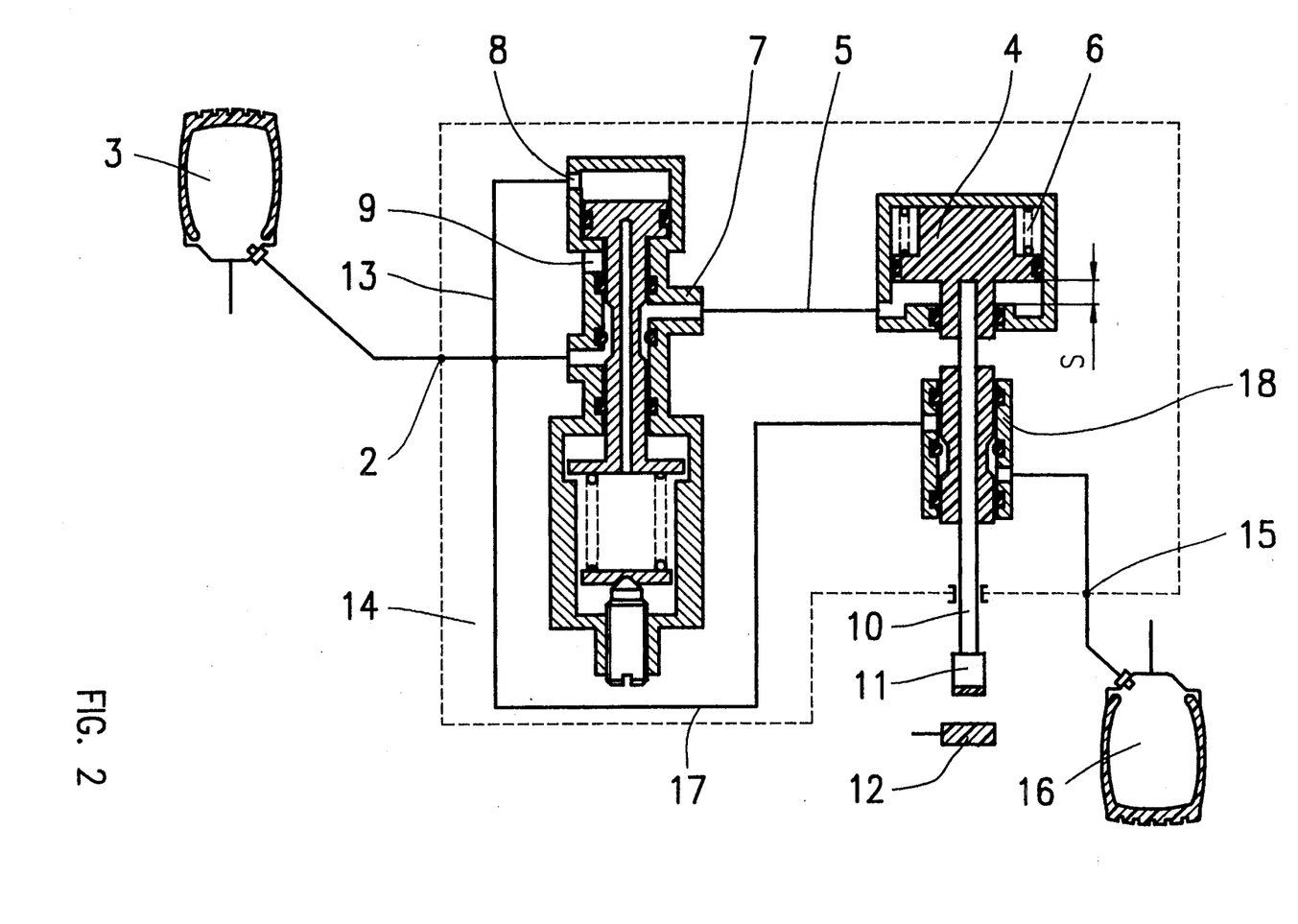
FIG. 2 is a view of a schematic diagram, similar to that of FIG. 1, with an embodiment allowing the monitoring of the pressure of twin tires.

A further pressure inlet port can monitor the pressure of a second vehicle tire. The further pressure inlet port 15 can be subjected to the pressure of a second tire 16. The further pressure inlet port 15 can be connected to the pressure inlet port 2 of the first tire 3 via a pressure line 17. A valve device 18 can be actuated by the actuator 4 generating the regulating distance S. The valve device 18 can be disposed in the pressure line 17 and can serve for connecting and separating the pressure inlet ports 2, 15. The valve device 18, actuatable by the actuator 4, can serve in a first switching position at a predetermined or above the predetermined tire pressure for a connection of the pressure inlet parts 2, ;5 and below a predetermined tire pressure for a separation of the pressure inlet ports 2, 15.

Figure 1:
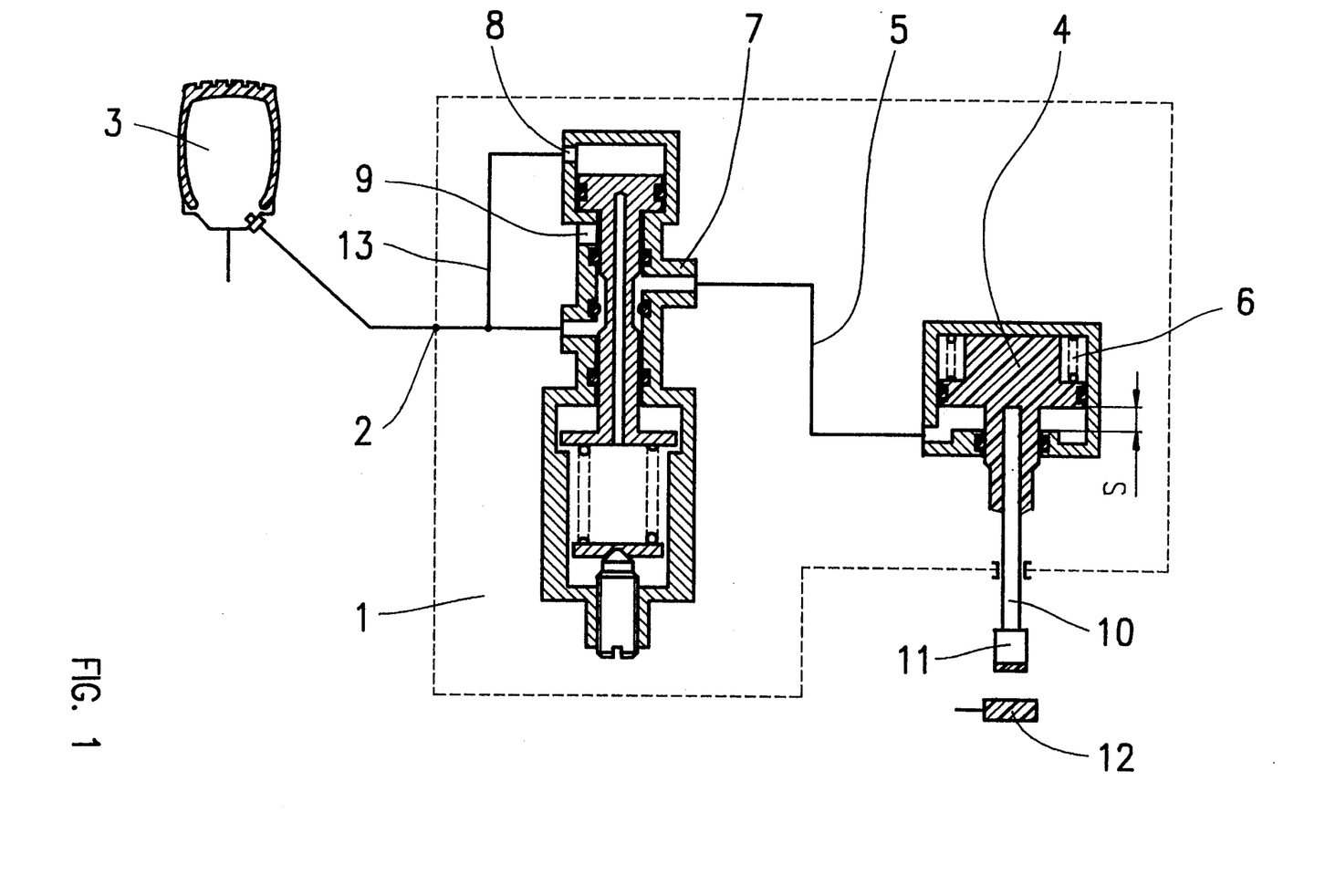
FIG. 1 is a view of a schematic diagram, illustrating a system for monitoring the pressure of a vehicle tire.

FIG. 1 illustrates a pressure sensitive device 1 with a pressure inlet port 2, disposed at a vehicle tire 3. The pressure inlet port 2 is connected to the vehicle tire 3 and can be subjected to the tire pressure. An actuator 4 can be connected to the pressure inlet port 2 via a pressure line 5 and can be subjected to the tire pressure against a restoring force furnished by a compression spring 6. A valve device 7 is furnished between the pressure inlet port 2 and the actuator 4. The valve device 7 can be controlled with the tire pressure and includes a control inlet port 8, where the control inlet port 8 can be subjected to the tire pressure. The switching of the valve device 7 occurs dependent on the tire pressure. The switching point of the valve device 7 can be set to a predetermined tire pressure.

The valve device 7 serves, in a first switching position at a predetermined tire pressure or above a predetermined tire pressure, to connect the pressure inlet port 2 to the actuator 4. According to a second switching position occurring below the predetermined tire pressure, the valve device 7 serves to seperate the pressure inlet port 2 from the actuator 4 and to connect the actuator 4 through a discharge port 9 to the atmosphere.

Figure 3:
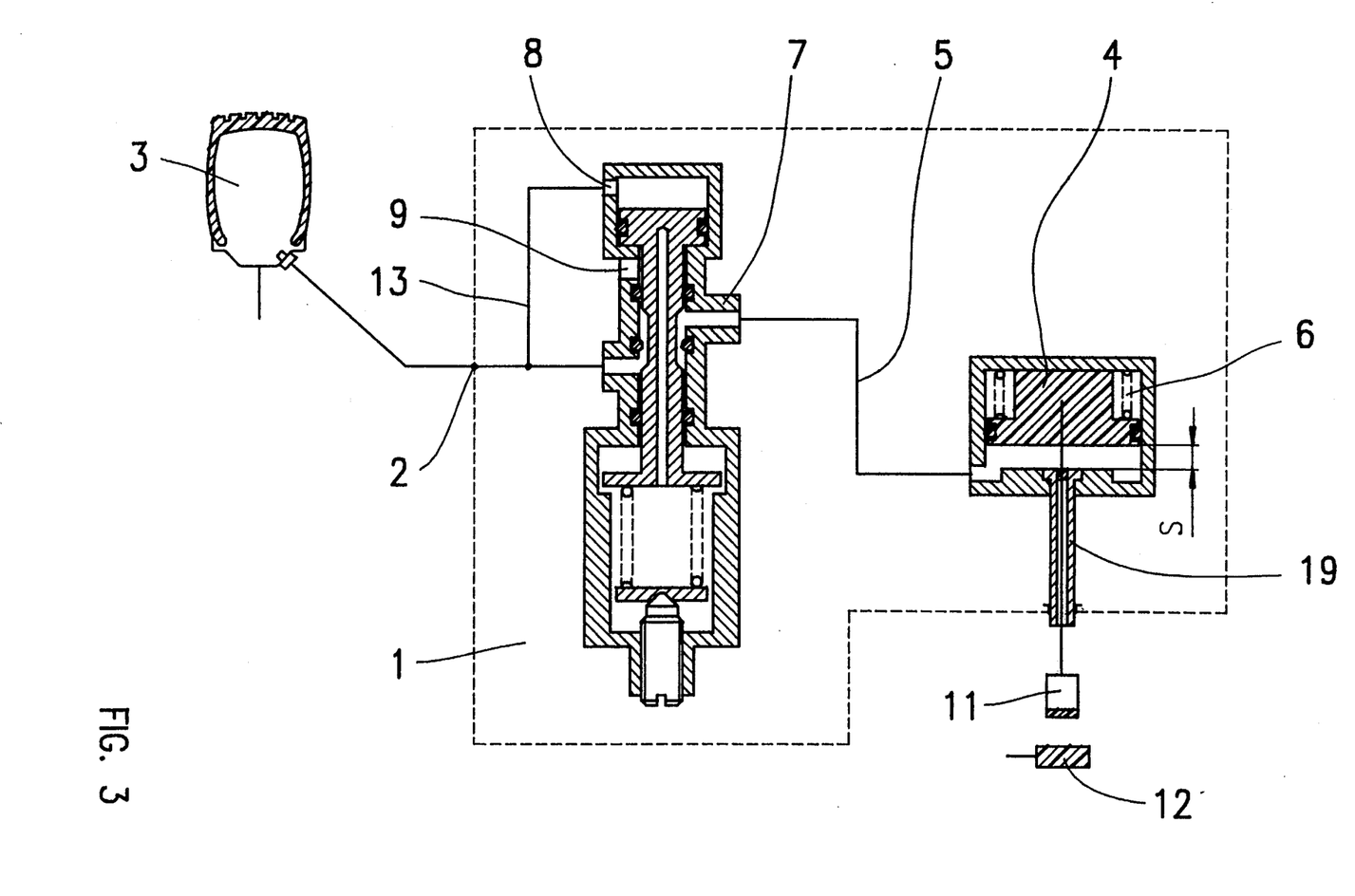
FIG. 3 is a schematic diagram, similar to that of FIG. 1, with an embodiment of a transfer mechanism formed of an elastic linkage furnished by an elastic Bowden train.

The actuator 4 can perform a stroke and the stroke can be set for generating a regulating distance S. A transfer mechanism 10 furnishing a linkage 19 is connected to the actuator 4. The linkage 19 can also be formed flexible in the kind of a Bowden train as illustrated in FIG. 3. A signal generating device component 11 is movable together with the transfer mechanism 10 relative to a sensor 12. The disposition of the signal generating device component 11 relative to the sensor 12 is provided such that the sensor 12 can sense and register the relative motion of the signal generating device component 11 and the sensor 12 can transform the relative motion of the signal generating device component 11 into corresponding control signals.

The signal generating device component 11 can, for example as taught in the German Printed Patent Document DE-28 13 058 C2, be disposed in a toothed gear ring of an antilock system device serving to sense the wheel speed, such that a thereby achieved modification of the antilock signal can be made recognizable as a tire pressure signal.

The mode of operation of the device according to FIG. 1 is as follows. If a tire pressure, which can be equal to or higher than the predetermined reference tire pressure, is present at the pressure inlet port 2, and thus the tire pressure is present via a control pressure line 13 at the control inlet port 8, then the valve device 7 is in a switch position as illustrated in the drawing, FIG. 1, wherein the actuator 4, serving as a pressure measuring member, is subjected to the tire pressure against the restoring force of the compression spring 6. The actuator 4 is retained in a position wherein the signal generating device component 11 moves away from the sensor 12 and no signal is generated.

Upon a dropping of the tire pressure below the predetermined reference tire pressure, the valve device 7 switches into a switching position after overcoming and surpassing a switching threshold, wherein the actuator 4 is relieved of pressure via the discharge port 9. Based on the now prevailing force of the compression spring 6, the actuator 4 passes the regulating distance S. Said regulating distance S is transferred via the transfer mechanism 10 to the signal generating device component 11. A signal is generated when the signal generating device component 11 approaches the sensor 12. The signal indicates a tire pressure which has dropped below the predetermined reference tire pressure or, a loss of pressure at the pressure inlet port 2, respectively.

The above described state of the signal generation of the pressure sensitive device 1 prevails as long as the tire reaches again the predetermined reference tire pressure based on refilling. The precedingly described mode of operation of the pressure sensitive device 1 is restored by this step, wherein the signal generating device component 11 is moved away from the sensor and does not generate a signal.

Figure 4:
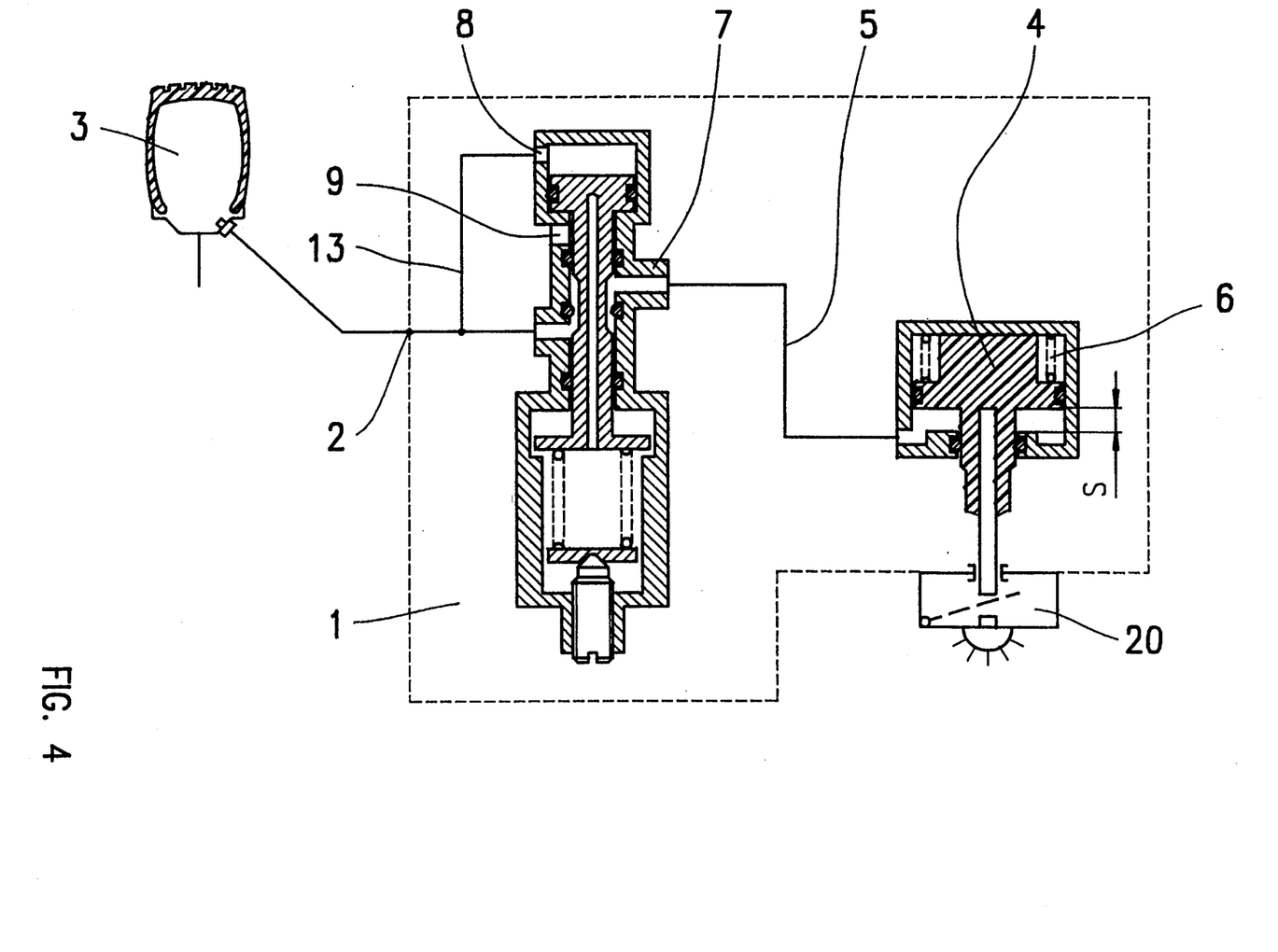
FIG. 4 is a schematic diagram, similar to that of FIG. 1, with an embodiment of a signal device.

Of course, the regulating distance S can also be used for the actuation of a mechanical display device 20, illustrated in FIG. 4, where the mechanical display device can then generate a signal instead of the signal generating device component 11 and the sensor 12, which signal can be perceived optically or acoustically, i.e., with energy transmission by a wave energy signal.

A pressure sensitive device 14 is illustrated in FIG. 2, where the pressure sensitive device 14 represents an expansion on the pressure sensitive device according to FIG. 1. The pressure sensitive device 14 according to FIG. 2 is, however, furnished with additional elements, which allow a monitoring of the pressure of twin tires. The pressure sensitive device 14 is connected via a pressure inlet port 2 to the tire 3 and via a further pressure inlet port 15 to a second tire 16. The two pressure inlet ports 2 and 15 are connected to each other via a pressure line 17. The tire pressures, present at the pressure inlet ports 2 and 15, act jointly onto the control inlet port 8 of the valve device 7 via the control pressure line 13.

The pressure inlet ports 2 and 15 can be connected to a valve device 18, disposed in the pressure line 17, or the pressure inlet ports 2 and 15 can be separated from each other. The valve device 18 can be actuacted with the actuator 4. The regulating distance S, which can be generated with the actuator 4, is used not only as a drive for the relative motion of the signal generating device component 11 toward the sensor 12, but can serve in this case also for the actuation of the valve device 18.

The mode of operation of the apparatus according to FIG. 2 is as follows. A control pressure, formed by a pressure balancing between the tires 3 and 16, is present in the control pressure line 13 during the illustrated operational mode of the pressure sensitive device 14, where the control pressure is not disposed below the predetermined reference tire pressure. The valve device 7 is therefore switched to open passage such that the actuator 4 is subjected to the pressure formed by the pressure balancing. The thus generated operating position of the actuator 4 effects that the valve device 18 is also switched to open passage and thus the pressure inlet ports 2 and 15 are connected to each other. The signal generating device component 11 is disposed opposite to the sensor 12 in a position, wherein no signal generation occurs.

In case of a defect of one of the two tires 3 or 16, the control pressure drops below the predetermined tire pressure based on the effect of the pressure balancing in the control pressure line 13. The valve device 7 thereby assumes the switching position, wherein the pressure directed toward the actuator 4 is released into the atmosphere and wherein the regulating distance S is overcome and generated by the device component 11. The motion of the signal generating device component 11 to the regulating distance S effects the motion of the valve device 18 into the closing position, wherein the two tires 3 and 16 are immediately and instantly separated from each other. A further pressure balancing in the sense of a pressure loss between the tires 3 and 16 is thereby prevented. The defective tire 3 or 16 can further lose pressure, however, the properly operating tire is secured against a further pressure loss. The switching cycles of the valve devices 7 and 18 are tuned to each other such that the switching to the signal generation and the separation of the tires 3 and 16 from each other, respectively, occurs immediately and instantly after the tire pressure drops below the reference tire pressure.

It will be understood that each of the elements described above, or two or more together, may also find a useful application in other types of brake and fault signal processing procedures differing from the types described above.

While the invention has been illustrated and described as embodied in the context of a device for monitoring the pressure of a vehicle tire, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for monitoring a pressure of a vehicle tire comprising
   a vehicle wheel;
   a tire mounted to the vehicle wheel;
   a pressure inlet port connected to the interior of the tire;
   a valve device having an inlet port, a control inlet port, and an outlet port, wherein the inlet port of the valve device is connected to the pressure inlet port, wherein the control inlet port is subjectable to a pressure present in the tire, and wherein the valve device is actuatable by the pressure present in the tire;
   an actuator connected to the outlet port of the valve device and actuatable by the pressure present in the tire, wherein the actuator is subjected to a restoring force, wherein the valve device transmits the pressure present in the tire to the outlet port and to the actuator in a first switching position of the valve device in a situation where the tire pressure is at a predetermined or above the predetermined tire pressure and wherein the restoring force opposes the pressure present in the tire and transmitted to the actuator, wherein the valve device separates the pressure inlet port from the actuator in a second switching position of the valve device in a situation where the pressure present in the tire has dropped to below the predetermined tire pressure and wherein the valve device connects the actuator through a discharge port to the atmosphere in the second switching position of the valve device, and wherein the actuator generates a regulating distance (S) corresponding to a transition position value from the first switching position of the valve device to the second switching position of the valve device, and wherein the actuator thereby indicates a drop of the pressure present in the tire.

2. The apparatus according to claim 1 further comprising
   a sensor for scanning the position of the actuator over a regulating distance S;
   a transfer mechanism transferring the position of the actuator to the sensor.

3. The apparatus according to claim 2, wherein the transfer mechanism is formed by an elastic Bowden train.

4. The apparatus according to claim 1 further comprising
   a mechanical signal device actuated by the actuator for generating an optically perceivable signal depending on the position of the actuator relative to the regulating distance (S).

5. The apparatus according to claim 1 further comprising
   a mechanical signal device actuated by the actuator for generating an acoustically perceivable signal depending on the position of the actuator relative to the regulating distance S.

6. The apparatus according to claim 1 further comprising
   a second tire;
   a second pressure inlet port for monitoring the pressure of the second tire, wherein the second pressure inlet port is subjected to the pressure of the second tire;

a first pressure line connected to the first pressure inlet port of the first tire;

a second pressure line connected to the second pressure inlet port of the second tire;

a second valve device having a first port connected to the first pressure line and having a second port connected to the second pressure line, wherein the second valve device provides a switchable connection between the first port and the second port and is actuatable by the actuator for connecting and separating the first pressure inlet port and the second pressure inlet port, wherein the second valve device actuatable by the actuator furnishes in a first switching position at a predetermined tire pressure and above the predetermined tire pressure a connection between the first pressure inlet port and the second pressure inlet port and below a predetermined tire pressure a separation of the first pressure inlet port from the second pressure inlet port.

7. The apparatus according to claim 1 further comprising adjustment means furnished at the valve device for setting a pressure switching determining a pressure set point between the two positions of the valve device.

8. The apparatus according to claim 1, wherein the valve device control inlet port is connected to the pressure inlet port.

9. An apparatus for monitoring a pressure of a vehicle tire comprising a pressure inlet port connectable to an interior of a tire;

a first valve device having an inlet port, a control inlet port, an outlet port and a discharge port, wherein the inlet port of the valve device is connected to the pressure inlet port, wherein the control inlet port is connected to the pressure inlet port for actuating the valve device depending on the pressure present at the pressure inlet port, wherein the valve device transmits the pressure present at the pressure inlet port to the outlet port in a first switching position of the valve device in a situation where the pressure at the pressure inlet port is at a predetermined pressure or above the predetermined pressure, wherein the valve device separates the pressure present at the pressure inlet port from the outlet port in a second switching position of the valve device in a situation where the pressure present at the pressure inlet port has dropped to below the predetermined pressure and wherein the valve device connects the outlet port through the discharge port to the atmosphere in the second switching position of the valve device;

an actuator connected to the outlet port of the valve device and actuatable by the pressure present at the outlet port, wherein the actuator is subjected to a restoring force, and wherein the restoring force opposes the pressure present at the outlet port and transmitted to the actuator, and wherein the actuator assumes a first positional value corresponding to a first switching position of the valve device, and wherein the actuator assumes a second positional value corresponding to the second switching position of the valve device, and wherein a transition of the actuator from the first positional value to the second positional value indicates a drop of the pressure present in the pressure inlet port.

10. The apparatus according to claim 9 further comprising a wheel supporting the valve device and the actuator;

a tire mounted to the wheel and connected to the pressure inlet port, wherein a distance between the first positional value and the second positional value is formed by a regulating distance (S).

11. The apparatus according to claim 9 further comprising a sensor for scanning the positional values of the actuator;

a transfer mechanism transferring the positional values of the actuator to the sensor.

12. The apparatus according to claim 11, wherein the transfer mechanism is formed by an elastic Bowden train.

13. The apparatus according to claim 9 further comprising a mechanical signal device acutuated by the actuator for generating an optically perceivable signal depending on the positional value of the actuator.

14. The apparatus according to claim 9 further comprising a mechanical signal device actuated by the actuator for generating an acoustically perceivable signal depending on the positional value of the actuator.

15. The apparatus according to claim 9 further comprising a second pressure inlet port connectable to a second tire;

a first pressure line connected to the first pressure inlet port;

a second pressure line connected to the second pressure inlet port;

a second valve device having a first port connected to the first pressure line and having a second port connected to the second pressure line, wherein the second valve device provides a switchable connection between the first port and the second port actuatable by the actuator for connecting and separating the first pressure inlet port and the second pressure inlet port, wherein the second valve device actuatable by the actuator furnishes in a first switching position at the predetermined tire pressure or above the predetermined tire pressure a connection between the first pressure inlet port and the second pressure inlet port and below a predetermined tire pressure a separation of the first pressure inlet port from the second pressure inlet port.

16. The apparatus according to claim 15 further comprising a first wheel supporting the first valve device and the actuator;

a tire mounted to the first wheel and connected to the first pressure inlet port and wherein the first pressure inlet port is subjected to the pressure of the first tire; a second tire connected to the second pressure inlet port for monitoring a pressure of the second tire, and wherein the second pressure inlet port is subjected to the pressure of the second tire.

17. The apparatus according to claim 9 further comprising adjustment means furnished at the valve device for setting a pressure switching determining a pressure set point between two positions of the first valve device.

18. An apparatus for a monitoring of a pressure of a vehicle tire, including the following features:
 a pressure sensitive device for scanning the tire pressure is furnished at a vehicle wheel, where the tire pressure sensitive device includes a pressure inlet port and wherein the pressure inlet port is connected to the tire;
 an actuator is furnished, which can be subjected to the tire pressure against a restoring force, where the actuator serves for the generation of a regulating distance (S), indicating a tire pressure drop;
 a valve device (7) is disposed between the pressure inlet port (2) and the actuator (4) and the valve device (7) is actuatable with the tire pressure, wherein the valve device (7) includes a control inlet port (8) and wherein the control inlet port (8) is subjectable to the tire pressure;
 wherein the valve device (7) serves in a first switching position at a predetermined or above a predetermined tire pressure to connect the pressure inlet port (2) to the actuator (4);
 wherein the valve device (7) serves in a second switching position below the predetermined tire pressure to separate the pressure inlet port (2) from the actuator (4) and to connect the actuator (4) through a discharge port (9) to the atmosphere.

19. The apparatus according to claim 18, wherein the restoring force (6), directed onto the actuator (4) and against the tire pressure, serves for generating the regulating distance (S) indicating a drop in tire pressure.

20. The apparatus according to claim 18, wherein a transfer mechanism (10) is furnished for the transfer of the regulating distance (S) to a sensor (12) scanning the regulating distance (S).

21. The apparatus according to claim 20, wherein the transfer mechanism (10) is formed of an elastic linkage (19), which linkage is an elastic Bowden train.

22. The apparatus according to claim 18, wherein the regulating distance (S), generatable with the actuator (4), serves for actuating a mechanical signal device, which allows to generate an optically or acoustically perceivable signal.

23. The apparatus according to claim 18, comprising a further pressure inlet port for monitoring the pressure of a second vehicle tire, wherein the further pressure inlet port (15) is subjected to the pressure of a second tire (16) and wherein the further pressure inlet port (15) is connected to the pressure inlet port (2) of the first tire (3) via a pressure line (17);
 a valve device (18) actuatable by the actuator (4) generating the regulating distance (S), wherein the valve device (18) is disposed in the pressure line (17) and serves for connecting and separating the pressure inlet ports (2, 15);
 wherein the valve device (18), actuatable by the actuator (4), serves in a first switching position at a predetermined or above the predetermined tire pressure for connection of the pressure inlet ports 2, 15 and below a predetermined tire pressure for a separation of the pressure inlet ports (2, 15).

24. An apparatus for a monitoring of a pressure of vehicle tires, comprising:
 a pressure sensitive device (1) for scanning the tire pressure and furnished at a vehicle wheel, where the pressure sensitive device (1) includes a first pressure inlet port (2), and wherein the first pressure inlet port (2) is connected to the first vehicle tire (3);
 an actuator (4), wherein the actuator is subjected to the tire pressure against a restoring force, and wherein the actuator serves for generating a regulating distance (S) indicating a tire pressure drop;
 a first valve device (7), serving in a first switching position at a predetermined or above a predetermined tire pressure to connect the first pressure inlet port (2) to the actuator (4),
 wherein the first valve device (7) serves in a second switching position below the predetermined tire pressure to separate the first pressure inlet port (2) from the actuator (4) and to connect the actuator (4) through a discharge port (9) to the atmosphere;
 a second pressure inlet port (15) for monitoring the pressure of a second vehicle tire (16), wherein the second pressure inlet port (15) is subjected to the pressure of a second vehicle tire (16), and wherein the second pressure inlet port (15) is connected to the first pressure inlet port (2) of the first tire (3) via a pressure line (17);
 a second valve device (18) actuatable by the actuator (4) generating the regulating distance (S), wherein the second valve device (18) is disposed in the pressure line (17) and serves for connecting and separating the first pressure inlet port (2) and the second pressure inlet port (15), wherein the second valve device (18), actuatable by the actuator (4), serves in a first switching position at a predetermined tire pressure and above the predetermined tire pressure to connect the first pressure inlet port (2) and the second pressure inlet port (15), and below a predetermined tire pressure to separate the pressure inlet port (2) from the pressure inlet port (15).

25. An apparatus for a monitoring of a pressure of vehicle tires, comprising:
 a pressure sensitive device for scanning a tire pressure and furnished at a vehicle wheel, where the pressure sensitive device includes a first pressure inlet port, and wherein the first pressure inlet port is connected to the first tire;
 a first valve device connected to the first pressure inlet port and serving to provide, in a first switching position at a predetermined or above a predetermined tire pressure, an open connection to the first pressure inlet port, and in a second switching below the predetermined tire pressure position a closing of the connection to the first pressure inlet port;
 an actuator connected to the first valve device, wherein the actuator is subjected to the tire pressure when the first valve device provides an open connection and against a restoring force, and wherein the actuator serves for generating a regulating distance indicating a tire pressure drop, and wherein the first valve device serves in the second switching position below the predetermined tire pressure to separate the first pressure inlet port from the actuator and to connect the actuator through a discharge port to the atmosphere;
 a second pressure inlet port to be connected to a second vehicle tire and for monitoring a pressure of a second vehicle tire, wherein the second pressure inlet port is subjected to the pressure of the second vehicle tire;

a pressure line connecting the second pressure inlet port to the first pressure inlet port of the first vehicle tire;

a second valve device disposed in the pressure line and actuatable by the actuator generating the regulating distance, wherein the second valve device serves for connecting and separating the first pressure inlet port and the second pressure inlet port, wherein the second valve device is actuatable by the actuator into a first switching position and into a second switching position, wherein the second valve device serves in a first switching position at a predetermined or above the predetermined tire pressure to connect the first pressure inlet port and the second pressure inlet port, and wherein the second valve device serves below a predetermined tire pressure to separate the first pressure inlet port from the second pressure inlet port.

* * * * *